(12) United States Patent
Shei

(10) Patent No.: US 7,328,654 B2
(45) Date of Patent: *Feb. 12, 2008

(54) FOOD WARMING APPARATUS

(75) Inventor: Steven M. Shei, Fort Wayne, IN (US)

(73) Assignee: Duke Manufacturing Company, St. Louis, MO (US)

( * ) Notice: Subject to any disclaimer, the term of this patent is extended or adjusted under 35 U.S.C. 154(b) by 498 days.

This patent is subject to a terminal disclaimer.

(21) Appl. No.: 10/698,693

(22) Filed: Oct. 31, 2003

(65) Prior Publication Data
US 2006/0185527 A1 Aug. 24, 2006

Related U.S. Application Data

(63) Continuation-in-part of application No. 10/680,626, filed on Oct. 7, 2003, now Pat. No. 7,105,779, which is a continuation-in-part of application No. 10/611,295, filed on Jul. 1, 2003, now Pat. No. 7,227,102.

(60) Provisional application No. 60/394,841, filed on Jul. 10, 2002.

(51) Int. Cl.
A47J 37/00 (2006.01)
A47J 39/00 (2006.01)

(52) U.S. Cl. ............... 99/468; 99/483; 99/448; 219/385; 219/386; 219/394; 219/399; 219/392; 219/486

(58) Field of Classification Search ............ 99/483, 99/484, 374, 389, 448, 468, 474, 476; 219/394, 219/413, 389, 399, 385, 392, 386, 214, 506, 219/486, 494
See application file for complete search history.

(56) References Cited

U.S. PATENT DOCUMENTS

| 466,416 A | 1/1892 | Hunt |
| 804,110 A | 11/1905 | Favorite et al. |
| 1,627,541 A | 5/1927 | Katzinger |
| 2,076,091 A | 4/1937 | O'Neill |
| 2,257,468 A | 9/1941 | Langel |

(Continued)

FOREIGN PATENT DOCUMENTS

GB 829729 3/1960

OTHER PUBLICATIONS

International Search Report and Written Opinion for PCT Application No. PCT/US04/35755, dated Mar. 8, 2005, 8 pages.

*Primary Examiner*—Reginald L. Alexander
(74) *Attorney, Agent, or Firm*—Senniger Powers

(57) ABSTRACT

In general, one embodiment of the invention is directed to apparatus for warming pre-cooked sandwich buns and the like to a desired holding temperature and then holding the buns at such holding temperature. The apparatus comprises a cabinet having at least one compartment with a bottom wall, a top wall and opposite side walls. Adjacent the bottom of the compartment is at least one heat source for delivering heat to buns in the compartment. A control mechanism controls the heat source to deliver heat to the buns to warm the buns to the desired holding temperature and then to vary the amount of heat delivered to the buns to hold the buns at the desired holding temperature. A related method is also disclosed.

21 Claims, 8 Drawing Sheets

U.S. PATENT DOCUMENTS

| | | |
|---|---|---|
| 2,779,497 A | 1/1957 | Kollman et al. |
| 2,964,609 A | 12/1960 | Anoff |
| 3,051,582 A | 8/1962 | Muckler et al. |
| 3,313,917 A | 4/1967 | Ditzler et al. |
| 3,353,885 A | 11/1967 | Tompkins |
| 3,353,886 A | 11/1967 | Tompkins |
| 3,597,238 A | 8/1971 | Scharre |
| 3,601,582 A | 8/1971 | Boisfleury |
| 3,681,568 A | 8/1972 | Schaefer |
| 3,751,629 A | 8/1973 | Eisler |
| 3,752,640 A | 8/1973 | Schneider |
| 3,908,749 A | 9/1975 | Williams |
| 4,024,377 A | 5/1977 | Henke |
| 4,099,512 A | 7/1978 | Noonan |
| 4,110,587 A | 8/1978 | Souder, Jr. et al. |
| 4,198,559 A | 4/1980 | Walter et al. |
| 4,235,282 A | 11/1980 | Filippis et al. |
| 4,784,054 A | 11/1988 | Karos et al. |
| 4,967,995 A | 11/1990 | Burgess |
| 5,188,020 A | 2/1993 | Buchnag |
| 5,235,903 A | 8/1993 | Tippmann |
| 5,365,038 A | 11/1994 | Mitsugu |
| 5,496,987 A | 3/1996 | Siccardi et al. |
| 5,653,905 A | 8/1997 | McKinney |
| 5,724,886 A | 3/1998 | Ewald et al. |
| 5,783,803 A | 7/1998 | Robards, Jr. |
| 5,852,967 A | 12/1998 | Fortmann et al. |
| 5,900,173 A | 5/1999 | Robards, Jr. |
| 5,947,012 A | 9/1999 | Ewald et al. |
| 6,011,243 A | 1/2000 | Arnold et al. |
| 6,031,208 A | 2/2000 | Witt et al. |
| 6,175,099 B1 | 1/2001 | Shei et al. |
| 6,262,394 B1 | 7/2001 | Shei et al. |
| 6,539,846 B2 | 4/2003 | Citterio et al. |

FOOD WARMING APPARATUS

CROSS REFERENCE TO RELATED APPLICATIONS

This application is a continuation-in-part of U.S. application Ser. No. 10/680,626, filed Oct. 7, 2003 and issued as U.S. Pat. No. 7,105,779 on Sep. 12, 2006, which is a continuation-in-part of U.S. application Ser. No. 10/611,295, filed Jul. 1, 2003 and published as Publication No. US2004/0020915 on Feb. 5, 2004, which claims the benefit of U.S. Provisional Application No. 60/394,841, filed Jul. 10, 2002, titled HOLDING OR COOKING OVEN. All of these applications are incorporated by reference herein in their entireties for all purposes.

BACKGROUND OF THE INVENTION

This invention relates generally to food service equipment and more particularly to equipment for maintaining previously cooked food at temperatures suitable for serving the food.

In one embodiment, this invention is especially directed to food service equipment that is used to heat pre-cooked bread products, such as sandwich buns (e.g., hamburger buns), to a desired holding temperature and then to maintain such products at such temperature before serving. In this regard, it is desirable to have warm buns at the point of sandwich assembly. A warm bun contributes to the perception of a hot, fresh sandwich.

There are two conventional processes used in the food service industry to warm sandwich buns. The first is to place the buns in a drawer warmer, which operates at a set temperature and may have humidity added to keep the buns from drying out. The problem with this method is that the temperature remains constant throughout the entire holding process. If the temperature is relatively high to heat the buns rapidly, the buns may heat up to a temperature which exceeds the ideal holding temperature, causing the bun quality to deteriorate prematurely. If the temperature is lower, the buns may take too long to reach the ideal holding temperature. The second conventional process is to place the buns in a toaster, which toasts the inside surface of the bun but contributes very little to raising the temperature of the bun.

There is a need, therefore, for apparatus which can be used in the food service industry to heat previously cooked food (such as sandwich buns) relatively rapidly to a desired holding temperature, and then to reduce the heat to the food to maintain the food at that temperature.

SUMMARY OF THE INVENTION

Among the several objects of this invention will be noted the provision of food warming apparatus which is adapted for heating pre-cooked food such as sandwich buns to a desired holding temperature and for then maintaining the food at such temperature in a way which extends the desired quality of the product; the provision of such apparatus which is compact and relatively inexpensive; the provision of an improved method for rapidly warming bread products such as sandwich buns and then maintaining such products at a desired temperature; and the provision of such apparatus and method for maintaining sandwich buns and the like in an environment where the quality of the buns is maintained at a high level for a longer period of time.

In general, one embodiment of the invention is directed to holding apparatus for holding pre-cooked food at a selected holding temperature. The apparatus comprises a cabinet having a plurality of holding compartments for holding pre-cooked food therein, a heat source in each compartment of the plurality of compartments for delivering heat to the food in the compartment, and a control mechanism programmed to vary the heat delivered by each heat source to the food in a respective holding compartment through a duration of holding time during which:

the control mechanism operates to activate the heat source such that the duration comprises a first period of time during which the heat source operates at a first duty cycle whereby the food reaches the selected holding temperature;

the control mechanism operates to activate the heat source such that the duration comprises a second period of time after the first period of time during which the heat source operates at a second duty cycle different from the first duty cycle whereby the food is held at the selected holding temperature; and the control mechanism operates to activate the heat source such that the duration comprises a third period of time after the second period of time at which the heat source operates at a third duty cycle different from the first and second duty cycles whereby the food is maintained at the selected holding temperature.

Other objects and features will be in part apparent and in part pointed out hereinafter.

BRIEF DESCRIPTION OF THE DRAWINGS

FIG. 1 is a perspective of one embodiment of an oven of the present invention for warming buns and the like;

Corresponding parts are designated by corresponding reference numbers throughout the drawings.

DETAILED DESCRIPTION OF THE PREFERRED EMBODIMENT

Figure 1:
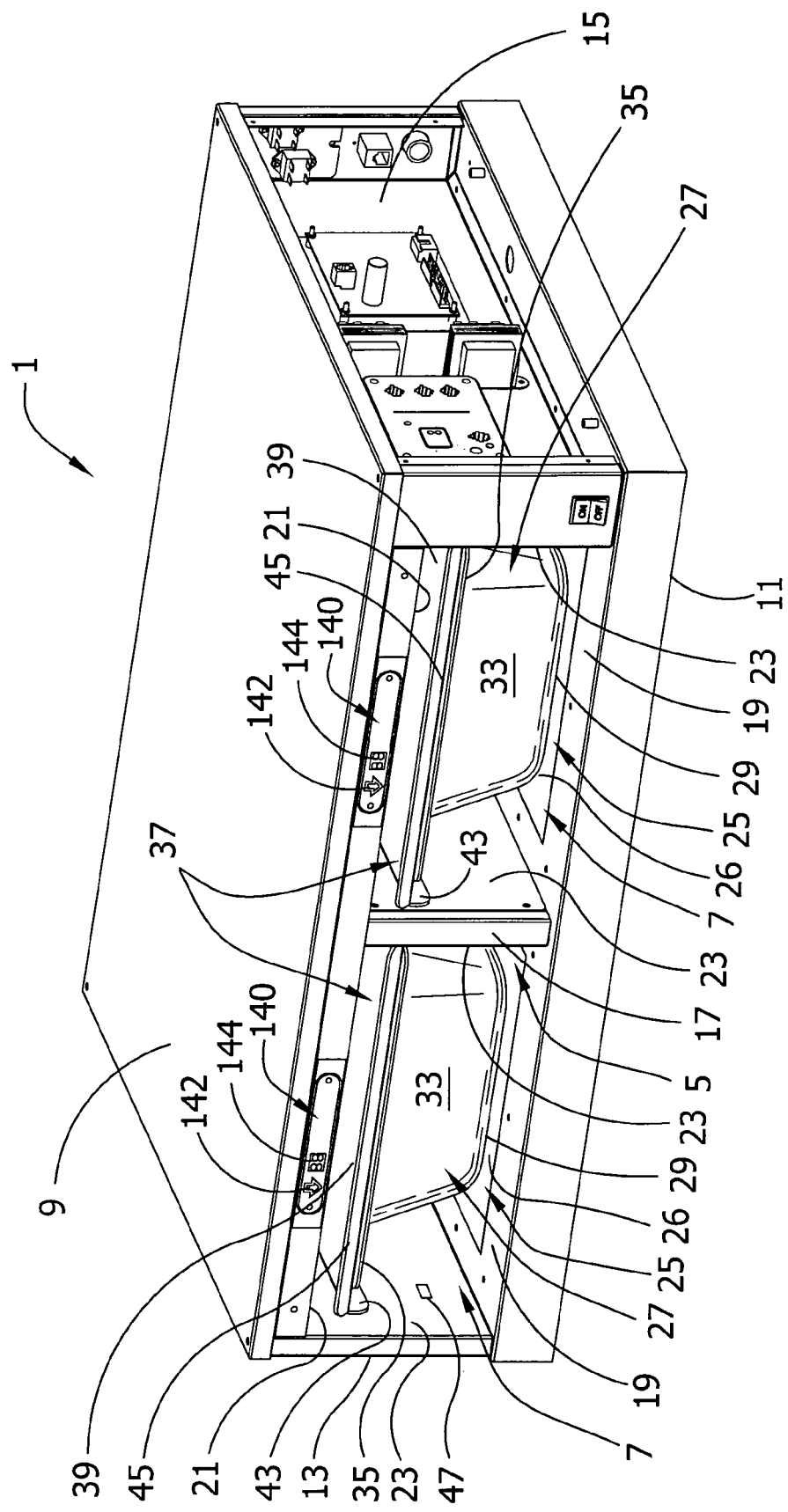
Figure 2:
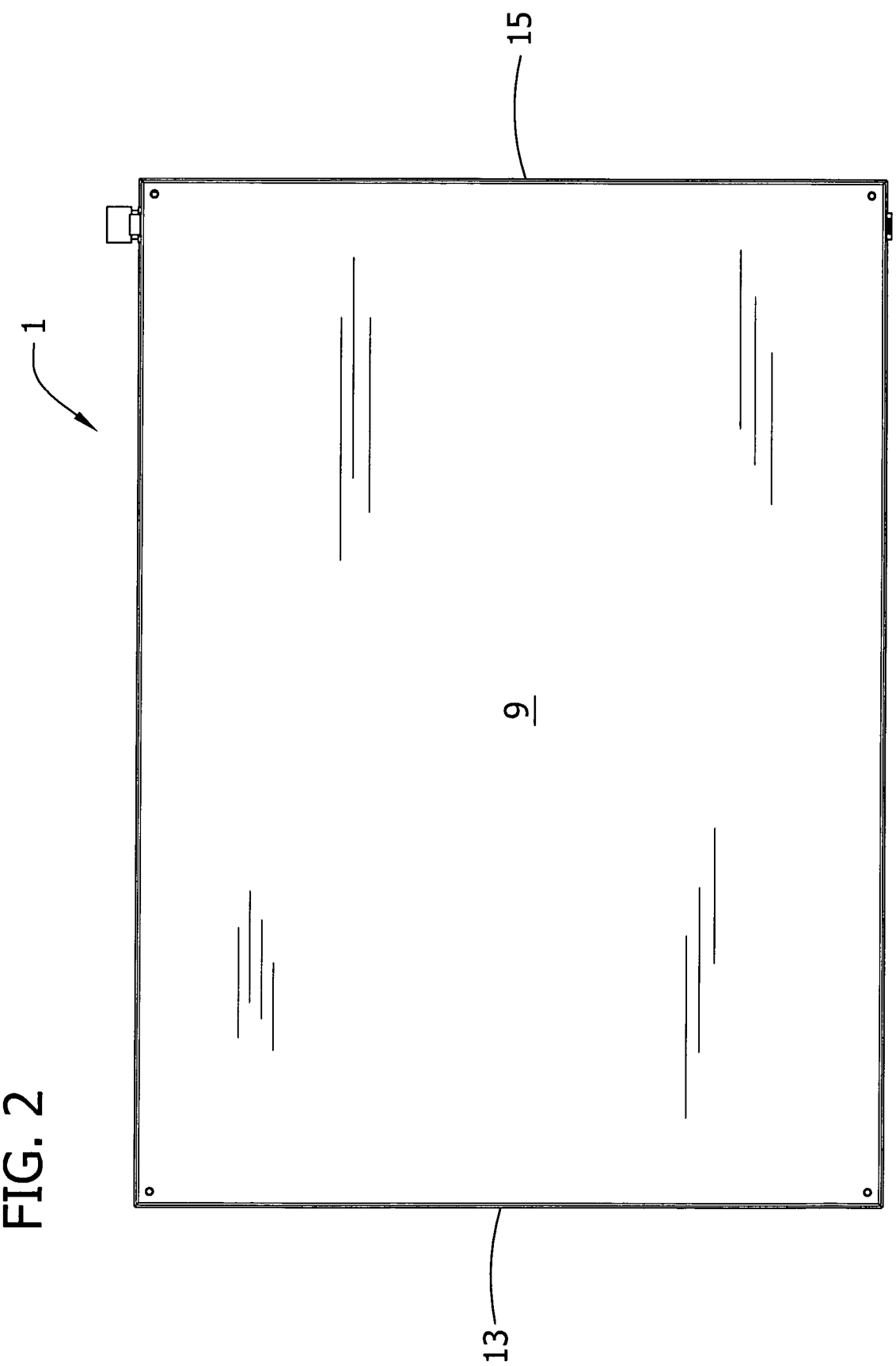
FIG. 2 is a top plan of the oven of FIG. 1.
Figure 3:
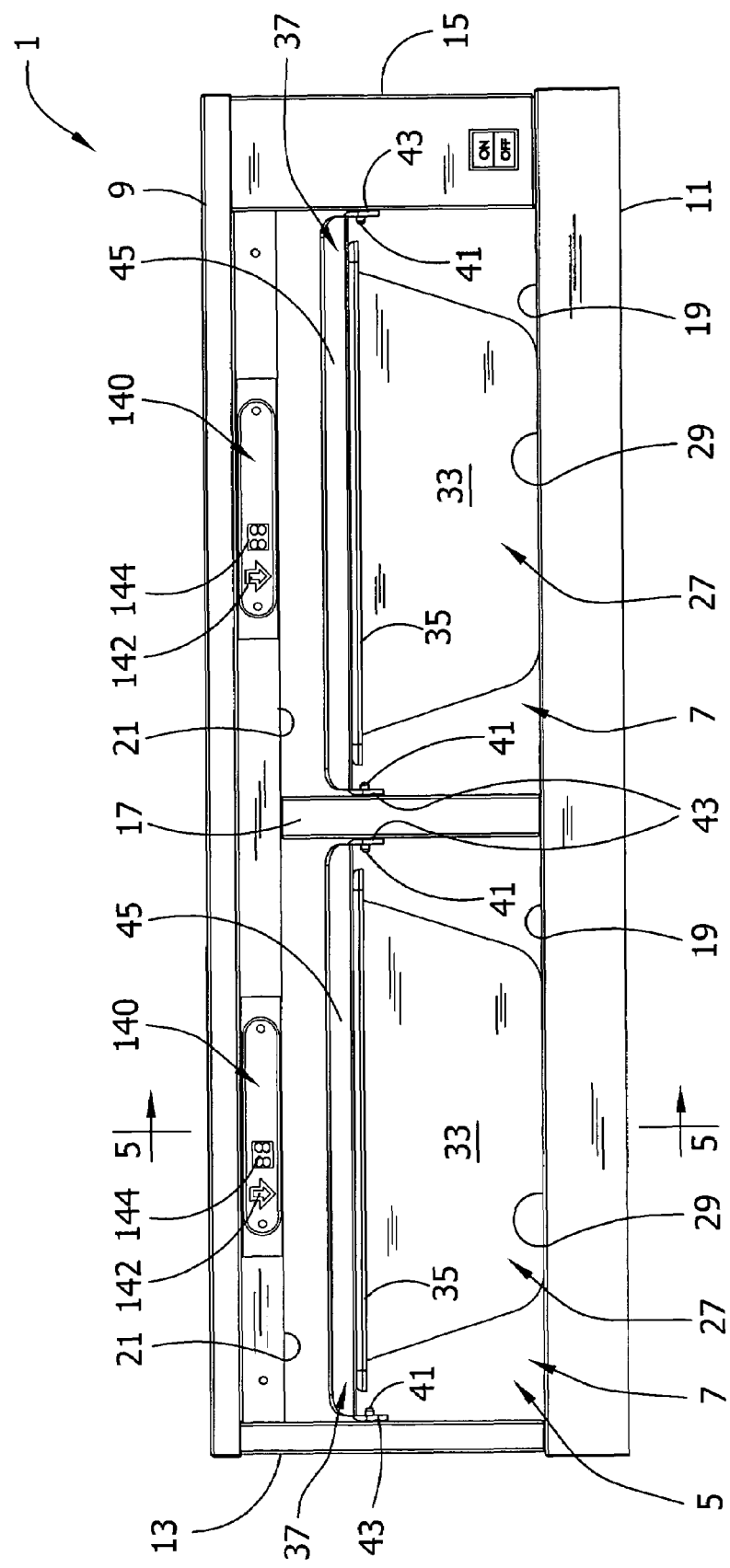
FIG. 3 is a front elevation of the oven of FIG. 1.
Figure 4:
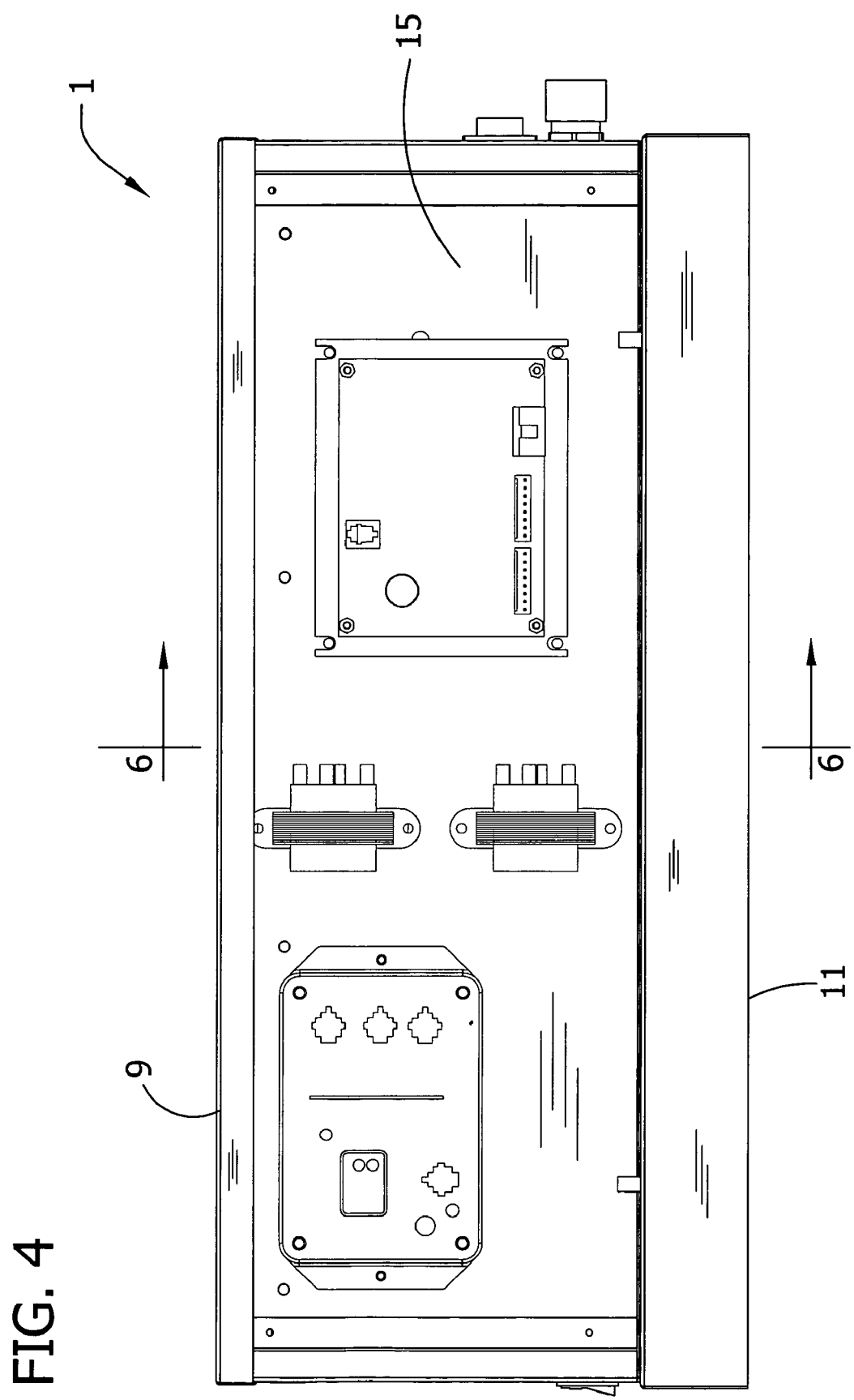
FIG. 4 is a right side elevation of the oven of FIG. 1.
Figure 5:
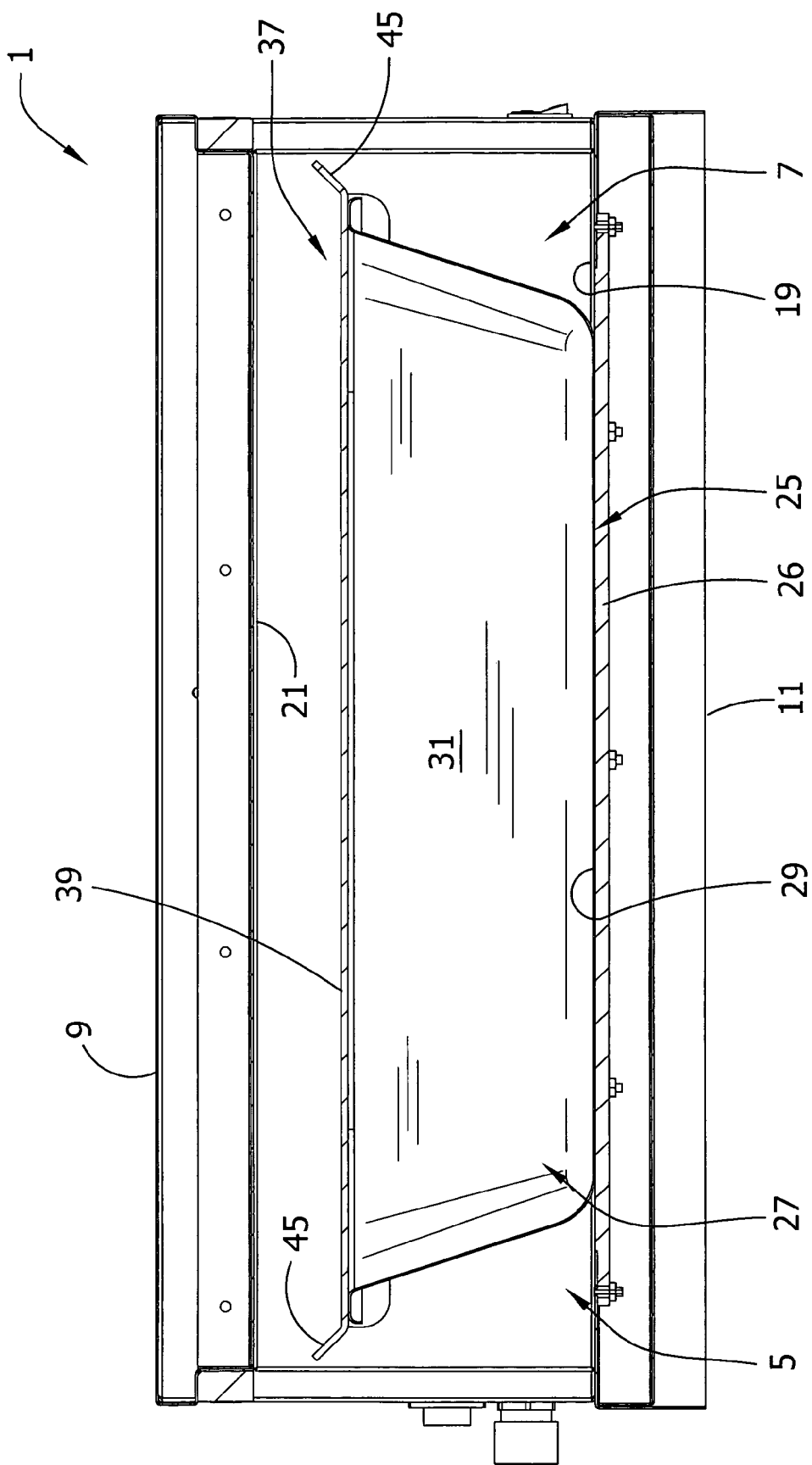
FIG. 5 is a vertical section taken on line 5-5 of FIG. 3.
Figure 6:
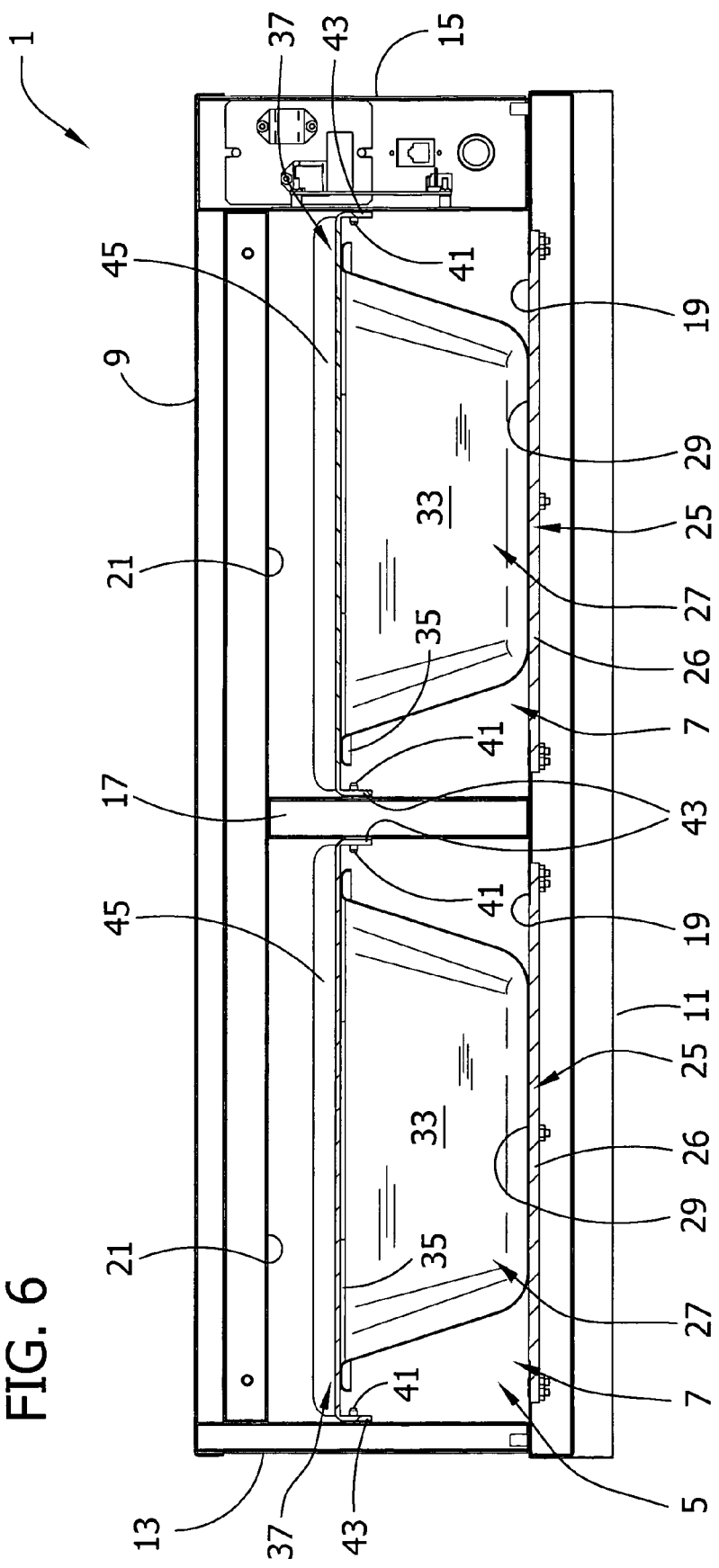
FIG. 6 is a vertical section taken on line 6-6 of FIG. 4.

FIGS. 1-6 illustrate one embodiment of apparatus of the present invention, generally designated 1. In this embodiment, the apparatus is a bun warming device (hereinafter referred to as an "oven") comprising a cabinet having an interior, generally indicated at 5, comprising one or more compartments, each designated 7, for removably receiving quantities of food. As shown, the oven 1 has two compartments 7, but is to be understood that the number of compartments may be any number more than two or less than two.

In the embodiment shown in FIGS. 1-6, the holding oven 1 has a top 9 (FIG. 2), a bottom 11, opposite sides 13 and 15 (FIG. 4), an open front and an open back. A vertical partition 17 separates the interior 5 of the oven 1 into two separate compartments 7, each having a bottom wall 19, a top wall 21, and opposite side walls 23. The front and back of each compartment 7 are open to permit food to be placed into the compartment and removed from the compartment from both directions (front and rear). Alternatively, the front and/or back could be closed by one or more doors or a fixed wall structure.

A heat source 25 is provided in each compartment 7 for delivering heat to the food (e.g., buns or other breads) in the compartment. In the embodiment shown in FIGS. 1, 5 and 6, the heat source, generally indicated at 25, comprises a metal plate 26 recessed into the bottom wall 19 of each compartment 7, and a suitable heater for heating the plate, such as one or more electrical resistance heating elements (not shown) below the plate. The side and top walls 23, 21 of the compartment 7 of this embodiment are not heated. The power delivered by each heat source 25 ranges from between about 20 and 2,000 watts, desirably between about 25 and 1500 watts, preferably between about 30 and 1000 watts, more preferably between about 35 and 750 watts and even more preferably between about 40 and 600 watts. In one embodiment, each heat source 25 delivers about 600 watts of radiant heat. Reference may be made to co-assigned U.S. Pat. Nos. 6,175,099, 6,262,394 and 6,541,739, incorporated herein by reference, for further details relating to the construction of certain types of heating elements suitable for use in the heat sources 25. Different heating mechanisms can be used without departing from the scope of this invention.

In one embodiment, the food placed in the oven 1 is held by one or more pans, generally indicated at 27, each of which has a bottom wall 29, one or more side walls 31 (FIG. 5) and/or end walls 33, and a top 35 which may be open or closed by a suitable cover (to be described later). The pans 27 can be of any size and any shape but are typically relatively large if buns are being held. For example, a common pan shape for buns is rectangular and commons sizes would include one-third size, one-half size and full-size steam table pans. (A one-third size rectangular steam table pan has a width of about 6-15/16 in. and a length of about 12-3/4 in.; a one-half size rectangular steam table pan has a width of about 10-7/16 in. and a length of about 12-3/4 in.; and a conventional full-size rectangular steam table pan has a width of about 12-3/4 in. and a length of about 20-7/8 in.) The depths of the pans 27 typically range from 2.5 in. deep to 8.0 in. deep. Thus, one or more of the compartments 7 of the oven 1 may be sized to receive a one-third size pan, one pan 27 per compartment, in which case each such compartment should have a width greater than 6-15/16 in. (e.g., about 8 in. or more) and a length greater than 12-3/4 in. (e.g., about 13.5 or more). Alternatively, one or more compartments 7 may be sized to receive a single one-half size pan, in which case each such compartment should have a width greater than 10-7/16 in. (e.g., about 12 in. or more) and a length greater than 12-3/4 in. (e.g., about 13.5 or more). Alternatively, one or more compartments 7 may be sized to receive a single full-size pan, in which case each such compartment should have a width greater than 12-3/4 in. (e.g., about 13.5 in. or more) and a length greater than 20-7/8 in. (e.g., about 22 in. or more). Custom pan sizes can be used to accommodate special batch sizes of food product. The compartments 7 of the oven 1 may be sized so that each compartment can receive only one pan 27 or multiple pans.

The compartments 7 are preferably constructed to prevent (or at least substantially inhibit) the transfer of food flavor from one compartment to another, as when warming different food products such as onion-topped sandwich buns and regular buns. (For additional detail regarding possible constructions to achieve this flavor transfer prevention feature, reference can be made to the aforementioned U.S. Pat. Nos. 6,175,099, 6,262,394 and 6,541,739.)

When placed in the oven 1, a pan 27 is preferably placed directly on the heating plate 26 in the respective compartment 7 for transfer of heat to the pan. However, it is contemplated that the pan 27 could be placed on a shelf or other support spaced above the heating plate 26.

In one embodiment, a cover, generally indicated at 37, is mounted in each compartment 7 in a position for overlying the open top 35 of a pan 27 placed into the compartment on the heating plate 26. The cover 37 includes a flat horizontal panel 39 supported over the pan 27 by pins 41 affixed to the side walls 23 of the compartment 7 and received in openings (e.g., vertical slots) in flanges 43 along opposite side edges of the panel 39, the arrangement being such that the cover 37 can "float" vertically in the compartment to accommodate pans 27 of different heights. The panel 39 has upturned lips 45 along its front and back edges for guiding the pan 27 into the compartment 7. The plate may be a rectangular plate of anodized aluminum sheet. In this particular embodiment, the cover 37 rests on the rim of the pan 27 to hold moisture in the pan to prevent the food therein from drying out. Alternatively, the cover 37 may be mounted at a fixed position spaced above the rim of the pan 27 a distance no greater than one inch, more preferably no greater than about 0.40 inch, and still more preferably no greater than about 0.30 in In the illustrated embodiment, the cover panel 39 is solid and has no openings in it. However, it is contemplated that the cover 37 may have one or more openings in it for venting moisture from the pan 27 below. The number, size and pattern of the vent openings will vary depending on the type of food, holding time, and other factors. Whatever the circumstances, the number, size and pattern of the opening(s) can be selected to closely control the amount of moisture vented from the pan 27 and thus optimize the conditions for maintaining food quality over an extended period of time.

Other cover arrangements are possible. For example, in one embodiment, each pan 27 is covered by a separate removable lid, either with or without vent holes for controlling moisture evaporation, thereby eliminating the need for a cover 37 in the compartment 7. In other embodiments, the pan 27 may be placed in the oven 1 without any lid or cover whatsoever.

The oven 1 includes a control mechanism, generally indicated at 140, for controlling operation of the oven 1. Preferably, the control mechanism 140 has an operator input device which, in one embodiment, comprises a touch pad 142 which allows the operator to interact with the control mechanism. The control mechanism 140 may include a separate input device for each compartment 7. Alternately, the operator input device can include dials, switches and the like known to those in the art. For example, rotatably mounted control dials mounted on the cabinet and movable in a push-and-turn fashion to any user-selected positions can permit operator input to the control mechanism 140. The control mechanism 140 may also include associated indicator lights to inform an operator of the status of a particular compartment 7 or the food within the compartment, such as whether the temperature in the compartment is at a desired temperature or whether the food in the compartment 7 is approaching or has exceeded the desired duration of holding time. The controls may be placed on the front and/or back of the cabinet to allow operation of the oven 1 from either or both locations. Further operation of the control mechanism 140 is described below.

The control mechanism 140 controls the amount of energy added during the warming and holding process and can be programmed using suitable software to adjust the energy input throughout the holding process. In this regard, it is generally desirable to heat sandwich buns, for example, relatively rapidly through a danger zone where bacteria multiply to a desired holding temperature (e.g., 110-150 degrees F. for sandwich buns). As used herein, the term "desired holding temperature" means either a single substantially constant temperature or a range of temperatures. Once this temperature is reached, it is desirable to reduce the energy input to a level which is sufficient to hold the food at a safe and optimal serving temperature for an extended period of time without losing significant product quality. The control mechanism 140 including the aforementioned software is preferably operable to control the environment (e.g., temperature) in each compartment 7 of the holding oven 1 independently of the other compartments 7, although it is contemplated that the control mechanism could maintain groups of compartments or all compartments 7 at the same environmental conditions.

In one embodiment, the control mechanism 140 uses a duty-cycle system to control the heat source 25 in each compartment 7. (As used herein, the term "duty cycle" means the ratio of heat source on-time to heat source on-time plus heat source off-time.) In this system, the control mechanism 140 comprises a suitable microprocessor and appropriate software to control relays or the like (not shown) that activate the heat sources 25. The control mechanism 140 can be programmed to control the heat sources 25 in the compartments 7 to adjust various parameters, such as, for example, the desired temperature of each compartment, the rethermalization time, the duration of heated holding time, the percentage heater on time, and the time base of the duty cycle, as more fully described below. As such, the control mechanism 140 can control operation of the heat sources independent of one another so that the temperature in each compartment 7 may be independently controlled.

Figure 7:
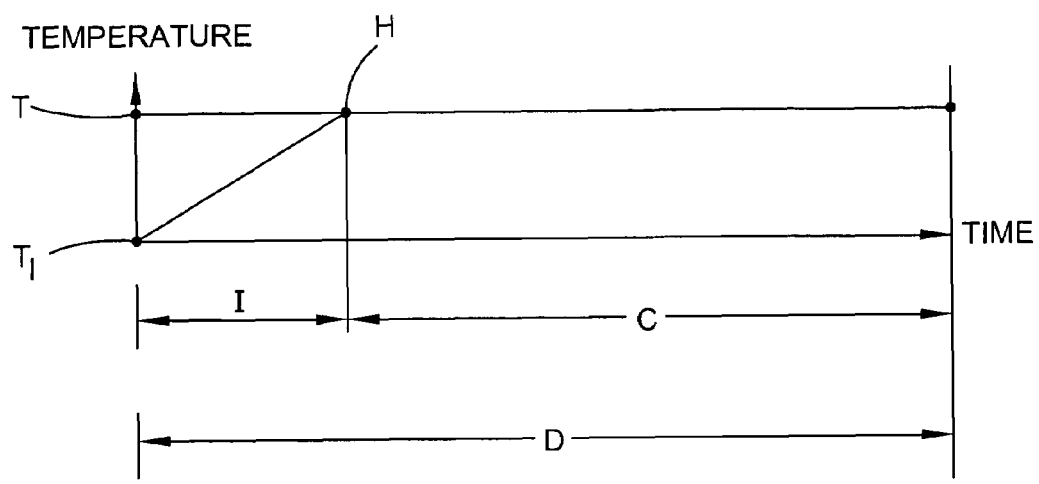
FIG. 7 is a diagram of a time vs. temperature curve illustrating one mode of operation of the oven of FIG. 1.
Figure 8:
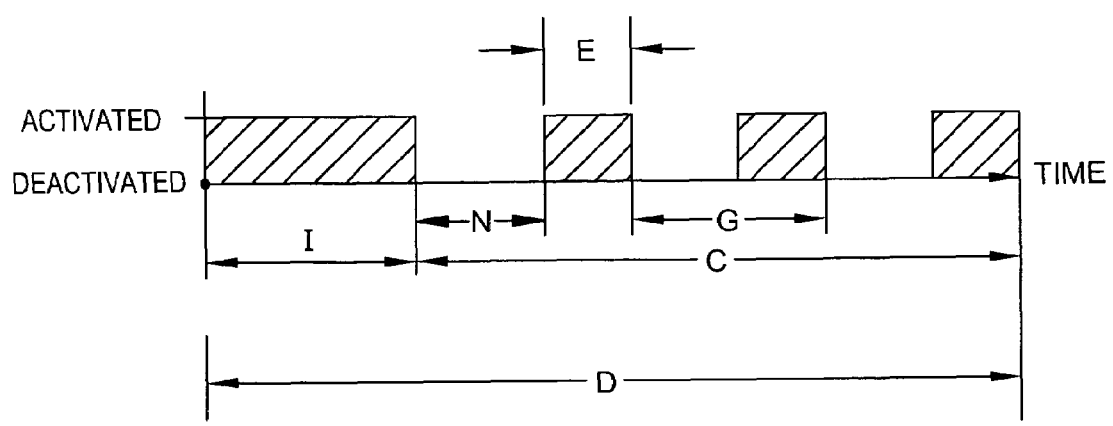
FIG. 8 is a time vs. heat source activation curve for the mode of operation depicted in FIG. 7.

Typically, the holding oven 1 operates in "heat up and hold" or "rethermalizing" mode. FIGS. 7 and 8 illustrate an example of the operation of the oven 1 in this mode. In particular, FIG. 7 illustrates a time vs. temperature curve for a complete hold cycle D for one compartment 7 of the oven 1, and FIG. 8 illustrates a time vs. activation curve for the heat source 25 of that same compartment 7 during the hold cycle D. The time vs. temperature curve of FIG. 7 plots the temperature of the food product as a function of time. One skilled in the art will understand that this curve can be different for each type of food product to be held in the oven 1.

In operation, the control mechanism 140 operates the heat sources 25 to raise the temperature of pre-cooked food (e.g., buns) in each compartment 7 to a desired temperature and then to hold the food at the desired temperature. The process is started by placing a pan 27 containing a food product at an initial temperature $T_I$ in a compartment 7 of the oven 1. (Temperature $T_I$ may vary from a frozen or refrigerated temperature to ambient or above.) Using the touch pad 142 or other input device, the operator selects a desired holding temperature T (which will be higher than the initial food temperature $T_I$), and a duration of holding time D. Alternatively, the control mechanism 140 can be programmed so that the operator need only select the type of food to be placed in the compartment 7, following which the control mechanism 140 is pre-programmed to automatically operate the heating source to heat the pre-cooked food in each compartment 7 according to a predetermined protocol suitable for the type of food in the compartment. In either case, the control mechanism 140 is operable to activate the heat source 25 to raise the temperature of the food product for a duration of heat-up or rethermalization time, indicated at I in FIG. 7, during which the heat source 25 may operate at a high level (e.g., 100% power) until the food reaches the holding temperature T at time H. The heat source 25 is then deactivated for a time interval indicated at N in FIG. 8, following which the heat source is activated and deactivated during the remainder of the heated holding time C for successive duty cycles G to maintain the food in the compartment 7 at the desired holding temperature T for the duration the total hold time D. In one embodiment, the duration of the heated holding time C includes intervals of the duty cycle G when the heat source 25 is activated as indicated by E and intervals during which the heat source is deactivated, as described above.

Set forth below are exemplary control settings for particular food products when the oven 1 is operating in a heat-up and hold mode.

EXAMPLE 1

Hamburger Buns

Rethermalization time (I)=10 minutes
Hold temperature (T)=125° F.
Time period without heat (N)=5 minutes
Time-base of duty cycle (G)=180 seconds
Percent on time (E)=25%
Total hold time (D)=45 minutes In the embodiments described above, the control mechanism 140 uses a duty-cycle system to control the amount of heat delivered to the food by the heat sources 25. In this type of system, the percentage of heater on and off time is adjusted to vary the energy level as needed to maintain the food at the suitable holding temperature T. It will be understood, however, that the control mechanism 140 can vary the amount of heat energy delivered to the food in other ways. For example, the heat sources may be variable-power heaters operable to deliver heat at multiple discrete energy levels or at an infinite number of levels between full-power and zero power (as by varying the voltage to the heaters), and the control mechanism 140 may operate to increase and decrease heat delivered by the heaters in a controlled, pre-programmed manner to maintain a particular food at its ideal holding temperature.

The particular program used by the control mechanism 140 to control a heat source 25 for any given type of food may be determined empirically. Alternatively, the control mechanism 140 can include one or more sensors 47 and one or more appropriate feedback loops for each compartment 7 or group of compartments of the oven 1. For example, in one embodiment, at least one sensor 47 is used in each compartment 7 to detect a characteristic indicative of the temperature of the food in the compartment 7, and the control mechanism is responsive to signals received from the at least one sensor to control the heat source 25 to vary the radiant heat delivered to the food to maintain it at a holding temperature T appropriate for that food. The characteristic detected by the one or more sensors 47 may be the temperature of the air in the compartment 7, or the temperature of a surface in the compartment, or the radiant IR energy emitted by the food in the compartment, or some other characteristic. Thus, the sensor 47 may be a standard temperature sensor, or an IR emissions detector, or some other type of detector capable of detecting the aforesaid characteristic indicative of the temperature of the food in the compartment 7.

As noted previously, the control mechanism 140 can be programmed for different types of food, so that after food has been placed in a particular compartment 7, an operator simply selects that type of food from a suitable menu on a display (not shown) on the cabinet. The control mechanism uses suitable software to automatically select the appropriate predetermined heating protocol for the food selected, including one or more of the following: the ideal holding temperature T for the food selected; the duration of warm-up time I and holding time C ("holding duration D"); and the manner in which the heat source 25 in each compartment 7 is to be varied to maintain the food at the desired holding temperature (e.g., percent on-time during each duty cycle, if duty cycles are used). For convenience, the control 140 also includes a timer which times out the holding duration D, and a display 144 which shows the time remaining until the end of holding duration. The control mechanism 140 may also include a visual and/or audible alarm for alerting an operator at a predetermined time before the end of the holding duration D, so that steps can be taken to obtain a fresh batch or batches of additional food. (At the end of a holding duration, any food remaining in the compartments 7 is typically disposed of and replaced by freshly cooked food.)

Figure 9A:
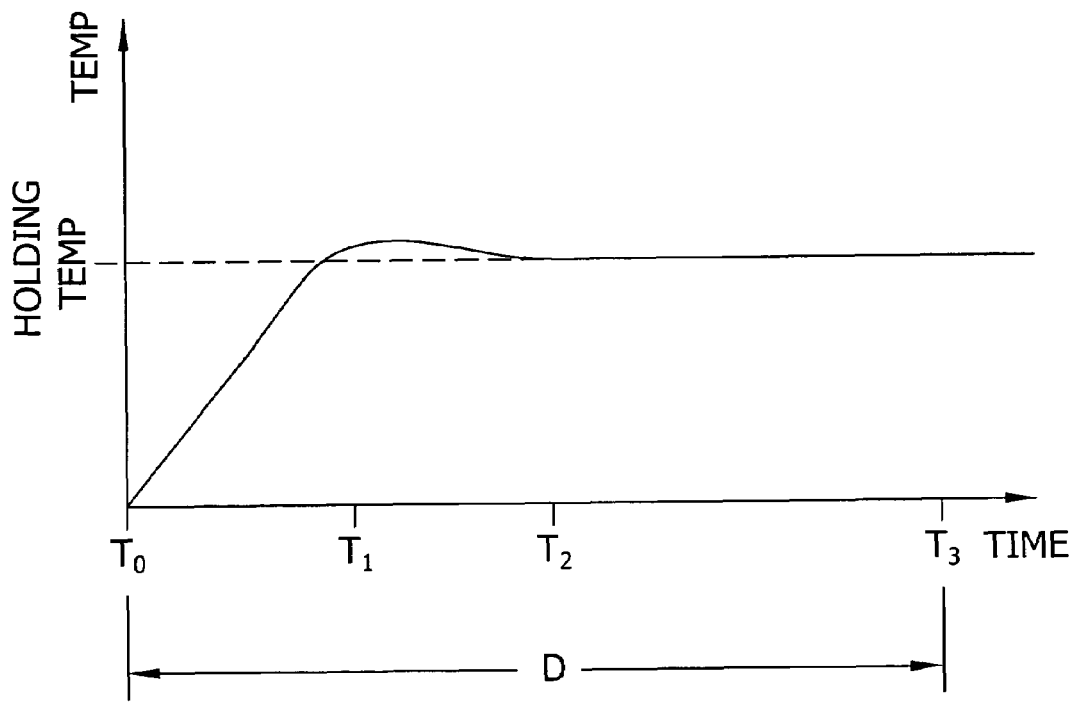
FIG. 9A is a diagram of a time vs. temperature curve illustrating another mode of operation of the oven in FIG. 1.
Figure 9B:
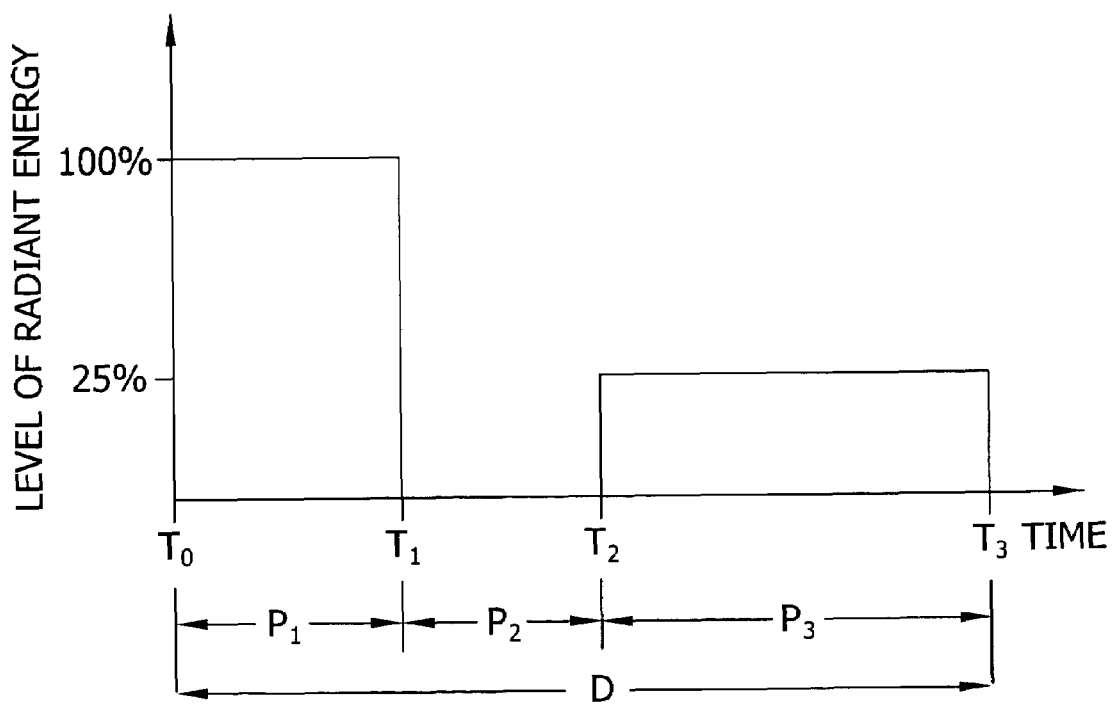
FIG. 9B is a time vs. heat energy curve for the mode of operation depicted in FIG. 9A.

FIGS. 9A and 9B are graphs illustrating exemplary temperature and energy input during a typical holding cycle of the oven 1. FIG. 9A graphs time v. temperature in one compartment 7. Food introduced into the compartment 7 at time $T_0$ warms up to the desired holding temperature at time $T_1$. Thereafter, the food is substantially maintained at the holding temperature for the remainder of the holding duration D. FIG. 9B is a graph of time v. the heat energy delivered by the heat source 25 to the food. In the particular embodiment shown in this graph, the heat source 25 is operated at a first relatively high level (e.g., 100% of maximum power) during a first phase P1 from time $T_0$ to time $T_1$, so that a relatively large amount of radiant energy is delivered to the food. As a result, the temperature of the food rises relatively rapidly toward the desired holding temperature. When the temperature of the food reaches (or slightly surpasses) the desired holding temperature, the control mechanism 140 causes the heat source 25 in the compartment 7 to deliver radiant heat at a second lower level (e.g., 0% of maximum) during a second phase P2 from time $T_1$ to time $T_2$. After the temperature of the food has equilibrated at the desired holding temperature, which will vary depending on the particular type of food, the control mechanism 140 causes the heat source 25 to increase the amount of heat delivered to the food to a third level (e.g., 25% maximum) sufficient to maintain the food at the desired holding temperature during a third phase P3 from time T2 until the end of the holding period at time T3. The amount of heat delivered to the food during the third phase P3 is less than during the first phase to achieve an optimum holding environment that will extend the holding time without significant loss of product quality.

It will be understood that the graphs shown in FIGS. 9A and 9B can vary, and that the number of phases P1, P2, P3 discussed above can vary without departing from the scope of this invention. (For example, phase P2 can be eliminated.)

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. The oven 1 or holding unit described above can be used to rethermalize virtually any kind of food products, although it is particularly suited for warming sandwich buns and the like. The control mechanism 140 of the oven 1 enables an operator to reduce or increase the energy input at any time during the process, thereby allowing rapid heating of the food products through a temperature zone where bacteria multiply rapidly, followed by a reduction of heat to hold the food at a safe and optimal serving temperature for an extended period during which the quality of the food is maintained at a high level. As various changes could be made in the above constructions without departing from the scope of the invention, it is intended that all matter contained in the above description or shown in the accompanying drawings shall be interpreted as illustrative and not in a limiting sense. For example, while the cabinet shown in the drawing illustrated has having two side-by-side compartments 7 arranged in a single horizontal tier of compartments 7, the cabinet could have more than one horizontal tier of compartments, and more than two compartments in each tier. Alternatively, the cabinet could have multiple compartments 7 stacked one on top of the other in a single vertical column of compartments.

What is claimed is:

1. Food holding apparatus for holding pre-cooked food at a selected holding temperature, said apparatus comprising:
   a cabinet having a plurality of holding compartments for holding said pre-cooked food therein;
   a heat source in each compartment of said plurality of compartments for delivering heat to the food in the compartment; and
   a control mechanism programmed to vary the heat delivered by each heat source to the food in a respective holding compartment through a duration of holding time during which:
   said control mechanism operates to activate said heat source such that said duration comprises a first period of time during which the heat source operates at a first duty cycle whereby the food reaches said selected holding temperature,
   said control mechanism operates to activate said heat source such that said duration comprises a second period of time after the first period of time during which the heat source operates at a second duty cycle different from said first duty cycle whereby the food is held at said selected holding temperature, and
   said control mechanism operates to activate said heat source such that said duration comprises a third period of time after the second period of time at which the heat source operates at a third duty cycle different from said first and second duty cycles whereby the food is maintained at said selected holding temperature.

2. Food holding apparatus as set forth in claim 1 wherein said second duty cycle is less than said first duty cycle and said third duty cycle is greater than said second duty cycle but less than said first duty cycle.

3. Food holding apparatus as set forth in claim 2 wherein said second duty cycle is zero.

4. Food holding apparatus as set forth in claim 2 wherein said heat source is located in a bottom wall of a respective holding compartment of said plurality of compartments.

5. Apparatus as set forth in claim 3 wherein each compartment of said plurality of compartments comprises opposite side walls which are not heated.

6. Apparatus as set forth in claim 5 wherein each compartment of said plurality of compartments comprises a top wall which is not heated.

7. Food holding apparatus as set forth in claim 1 wherein said second duty cycle is greater than said first duty cycle and said third duty cycle is less than said second duty cycle but greater than said first duty cycle.

8. Food holding apparatus as set forth in claim 7 wherein said first duty cycle is zero.

9. Food holding apparatus as set forth in claim 8 wherein said heat source is located adjacent a top wall of a respective holding compartment of said plurality of compartments for emitting radiant heat down on said food.

10. Apparatus as set forth in claim 1 further comprising a vertical partition in the cabinet dividing the cabinet into a plurality of separate side-by-side compartments, and wherein said control mechanism is programmed for controlling operation of the heat sources independent of one another whereby the temperature in each compartment of said plurality of compartments may be independently controlled.

11. Apparatus as set forth in claim 1 wherein said control mechanism comprises an operator display device for counting down a time remaining in said duration of holding time.

12. Apparatus as set forth in claim 1 wherein said control mechanism comprises at least one sensor in each holding compartment of said plurality of compartments for detecting a characteristic indicative of the temperature of the food in the compartment, the control mechanism being responsive to signals from said sensor to vary the amount of heat delivered by a respective heat source.

13. Apparatus as set forth in claim 12 wherein said sensor is a temperature sensor for detecting the temperature of a surface in a respective compartment of said plurality of compartments.

14. Apparatus as set forth in claim 12 wherein said sensor is operable to detect radiant energy emitted by the food in a respective compartment of said plurality of compartments.

15. Apparatus as set forth in claim 1 wherein said control mechanism is programmed to operate each heat source during each of said first, second and third periods of time in successive time-based cycles, each time-based cycle comprising a predetermined on-time interval during which the heat source is activated and a predetermined off-time interval during which said heat source is de-activated, and wherein said control mechanism is programmed to vary the amount of heat by changing the ratio of said predetermined on-time interval to the sum of said predetermined on-time and off-time intervals.

16. Apparatus as set forth in claim 1 wherein said control mechanism varies the amount of heat delivered by said heat source without deactivating the heat source.

17. Apparatus as set forth in claim 1 further comprising a cover secured to one or more walls of at least one of the compartments of said plurality of compartments for covering a pan in said at least one compartment to inhibit the escape of moisture from food in the pan.

18. Apparatus as set forth in claim 17 wherein said cover floats up and down to accommodate pans having different heights placed in said at least one compartment of said plurality of compartments.

19. Apparatus as set forth in claim 1 wherein the compartments of said plurality of compartments are arranged side-by-side.

20. Apparatus as set forth in claim 19 further comprising a plurality of pans for placement in said plurality of compartments, and wherein each compartment of said plurality of compartments is sized for receiving only one of said pans per compartment.

21. Apparatus as set forth in claim 1 further comprising pre-cooked food in each holding compartment of said plurality of holding compartments, said radiant heat source in the holding compartment being spaced above the food a distance less than 30.5 cm for delivering radiant heat to the food.

* * * * *